Sept. 1, 1953 M. P. GIRARD 2,650,597
LIPSTICK CASE WITH MIRROR THEREON
Filed Aug. 17, 1951

Marie P. Girard
INVENTOR.

Patented Sept. 1, 1953

2,650,597

UNITED STATES PATENT OFFICE 2,650,597

LIPSTICK CASE WITH MIRROR THEREON

Marie P. Girard, Pomona, Calif.

Application August 17, 1951, Serial No. 242,279

2 Claims. (Cl. 132—79)

The present invention relates to certain new and useful improvements in lipstick constructions and has more particular reference to a lipstick case embodying a lipstick and holder therefor which is adapted to be held in one hand and a cover section which is adapted to be held in the other hand, said cover section being novel in that it has a reflecting mirror incorporated thereon.

As the introductory statement implies, lipstick case and mirror combinations are not new. In certain instances, the mirror takes the form of a readily applicable and removable attachment. More specifically, one novel aspect of the present improvement has to do with adapter means for applying the mirror in the most desirable and suitable position on the closed end of the cover or cap, said means being not only ornamental but highly utilitarian in that it is of truncated-conical configuration, making it possible to utilize the larger diametered end as a foundation and mount for a reflecting mirror of a diameter considerably larger than the cross-section or diameter of the lipstick case.

Then, too, novelty is predicated on a mirror mounting adapter which is applied to the closed end of the cover section of the case and which is of moldable material, such as commercial plastics, whereby it is possible to obviate the need of a bezel for mounting the mirror and too, instead, to embed the mirror in the plastic mounting itself.

What is more important, the invention has to do with a finished cover section and mirror combination in which the utilization of commercial plastics as an embedding mount for the mirror is of great advantage in that the desired shades and colors may be incorporated in the plastic product, the colors being arbitrary if desired, or if preferred, the color on each given case corresponding to the color or shade of the lipstick which is contained therein.

Other objects and advantages will become more readily apparent from the following description and the accompanying sheet of illustrative drawings.

Figure 1:
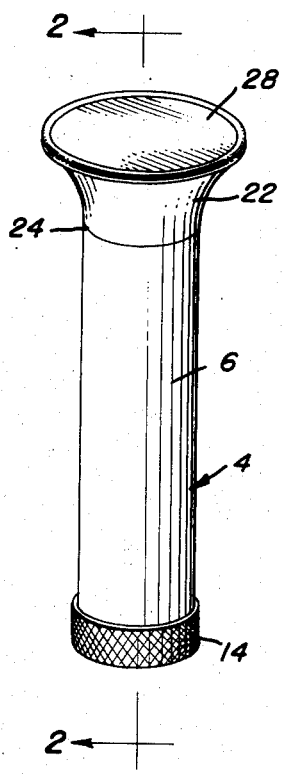
Figure 2:
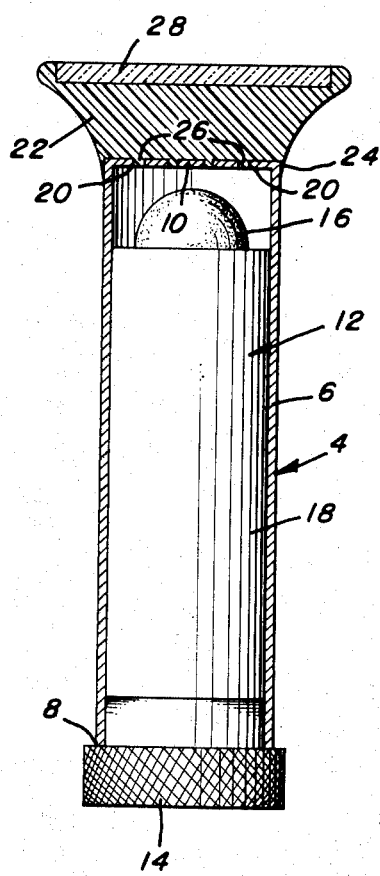

In the accompanying sheet of drawings wherein like numerals are employed to designate like parts throughout the views:

Figure 1 is a perspective view of a lipstick case and mirror combination constructed in accordance with the principles of the present invention; and, Figure 2 is an enlarged central longitudinal section taken on the plane of the line 2—2 of Figure 1, looking in the direction of the arrows, the lipstick and holder therefor appearing in elevation.

Referring now to the drawings by reference numerals and lead lines, the case, considered in a unitary structural sense, is denoted by the numeral 4. Insofar as the present invention is concerned, said case may be what would be construed to be any conventional style or form. Generally speaking, the case in which a lipstick is contained, is generally construed as embodying a cap or cover section and an insertable and removable holder for the lipstick. The holder is such that the lipstick itself is projectable and retractible in a well known manner. The instant situation is no exception in that the case comprises a cylindrical cap or cover section 6 which is open at the end 8 and closed at its opposite end 10. The lipstick holder is denoted by the numeral 12 and embodies a cylindrical sheath with a knurled plug or grip 14 for operating suitable operating means within the sheath (not shown) to project and retract a lipstick 16. The sheath for convenience is referred to by the numeral 18. Obviously, all of these parts are old.

The improvement herein under advisement and as already clarified has to do with the added mirror. As previously pointed out it is not new to incorporate a mirror in axial alignment with the case or cover of a lipstick construction. Usually, the mirror is incorporated in one end of the cover or cap section and actually forms one end wall of the chamber into which the lipstick holder projects. Here, it will be noticed that the lipstick holder projects into the cover section and that the cover section is unaltered except it may be, under certain circumstances, provided with slits 20 which serve as keyways for the plastic adapter or mount 22. This member 22 is preferably a frusto-conical or truncated-conical body of commercial plastics of a suitable hard substantially indestructable grade. The truncated end portion corresponds substantially in diameter to the slotted end portion of the cover section and it abuts said end portion and has an overhanging lip or flange 24 which slightly surrounds the cover section and provides an effective seal. Since the plastics material used is moldable it will be evident that the mount or adapter should be applied in a heated partly melted state so that portions of the plastic may flow into the slots and form anchoring keys as at 26. The mount is of solid material and the larger outer end is of increased diameter, that is, of a diameter appreciably greater than the cross-sectional diameter of the case 4. The outer end of the mount is substantially flat and a flat reflecting mirror 28 is solidly embedded therein. Thus, in this situation, the mirror is at a distance spaced away from the closed end of the cap or cover section.

Using colored plastics makes it possible to rely upon solid colors or mixed colors for purely ornamental purposes or for purposes for identifying the particular shade of the lipstick which is held in the case. Furthermore, the color aspect is desirable in that it is within the purview of the invention to provide a plurality of cap sections by themselves each with variously colored mirror mounts. This aspect of the matter would be for such harmonious results as would attend having selectively usable mirror mounts and cover sections to blend with one's apparel.

It will be evident from the foregoing that novelty is predicated on the plastic adapter and mount with the mirror as an attachment for a cover section, on an arrangement wherein the mount is applied directly to the cover section and also on the overall combination wherein the mount is threaded fixedly on the cover section and the cover section is made a part of the complete lipstick containing case.

Minor changes in shape, size, materials and rearrangement of parts may be resorted to in actual practice provided no departure is made from the invention as claimed.

Having described the invention, what is claimed as new is:

1. In combination, a case embodying a cover section open at one end and closed at the opposite end, a lipstick, a holder in which said lipstick is mounted, said holder being fitted in said cover section through the open end of the latter, a truncated-conical adapter of colored commercial plastics having its truncated end bonded axially to the closed end of said cover sections, the other end being of enlarged predetermined diameter and a face mirror embedded in the enlarged diametered end.

2. For use in connection with a lipstick case construction, a cylindrical cover section open at one end and substantially closed at its opposite end, the latter end being provided with slots, a plastic mount annexed axially to the closed end of said cover section and having portions thereof keyed in said slots, said mount being of general frusto-conical configuration and the outwardly disposed end portion thereof being provided with an embedded reflecting mirror.

MARIE P. GIRARD.

References Cited in the file of this patent

UNITED STATES PATENTS

| Number | Name | Date |
| --- | --- | --- |
| 1,655,452 | Ament | Jan. 10, 1928 |
| 1,766,990 | Freeman | June 24, 1930 |
| 2,456,948 | Kaye | Dec. 21, 1948 |